United States Patent [19]

Fuller

[11] 4,007,082
[45] * Feb. 8, 1977

[54] KRAFT MILL RECOVERY SYSTEM
[75] Inventor: Willard A. Fuller, Grand Island, N.Y.
[73] Assignee: Hooker Chemicals & Plastics Corporation, Niagara Falls, N.Y.
[ * ] Notice: The portion of the term of this patent subsequent to Dec. 7, 1993, has been disclaimed.
[22] Filed: Aug. 15, 1975
[21] Appl. No.: 605,094
[52] U.S. Cl. .................. 162/30 K; 162/DIG. 8; 423/190; 423/207
[51] Int. Cl.² .............. D21C 11/04; D21C 11/12
[58] Field of Search .......... 162/17, 29, 30, DIG. 8; 423/190, 199, 206, 207, 422, 551, 499; 23/270 R; 210/21; 261/113

[56] References Cited
UNITED STATES PATENTS

| 357,824 | 2/1887 | Hawlczek | 423/422 |
|---|---|---|---|
| 364,552 | 6/1887 | Solvay | 423/422 |
| 1,815,328 | 7/1931 | Richter | 423/422 |
| 1,865,833 | 7/1932 | Chesny | 423/422 |
| 3,243,318 | 3/1966 | Mihara et al. | 261/113 |
| 3,322,492 | 5/1967 | Flood | 162/30 |
| 3,560,329 | 2/1971 | Nelson et al. | 423/422 |
| 3,800,026 | 3/1974 | Morgan | 423/499 X |
| 3,801,370 | 4/1974 | Porter et al. | 23/270 R |
| 3,833,462 | 9/1974 | Moy et al. | 162/29 |
| 3,870,784 | 3/1975 | Saeman | 423/422 |

FOREIGN PATENTS OR APPLICATIONS

| 1,112,617 | 5/1968 | United Kingdom | 162/DIG. 8 |
|---|---|---|---|
| 233,878 | 5/1925 | United Kingdom | 261/113 |

Primary Examiner—S. Leon Bashore
Assistant Examiner—Peter F. Kratz
Attorney, Agent, or Firm—Peter F. Casella; William J. Crossetta, Jr.

[57] ABSTRACT

An improved process for the treatment of precipitator catch wherein the catch is slurried with water, sufficient carbon dioxide is added to convert the sodium carbonate present to sodium bicarbonate, and sodium chloride is separated from the sodium sulfate and sodium bicarbonate.

9 Claims, 1 Drawing Figure

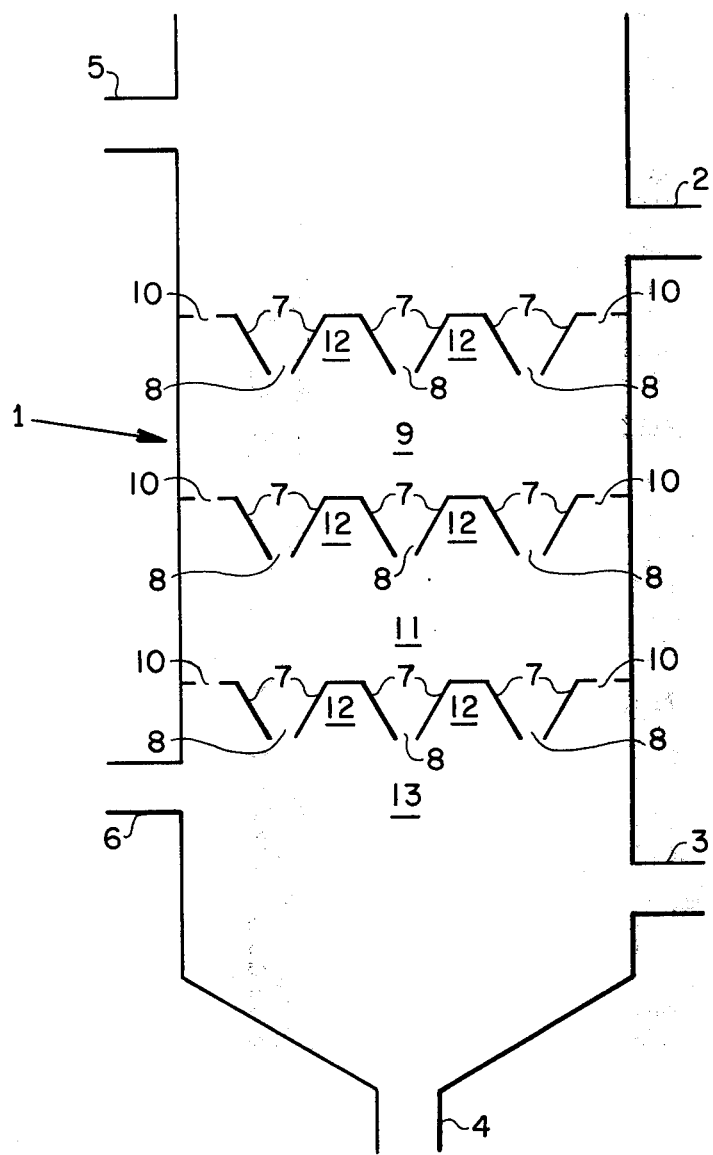

KRAFT MILL RECOVERY SYSTEM

The present invention relates to kraft pulping processes. More particularly, the present invention relates to reduction of losses and improved separatory techniques in kraft pulping processes.

In the conventional kraft pulping processes currently employed for the production of cellulosic fibrous pulp materials, lignocellulosic material is pulped with what is termed as "white liquor" containing sodium hydroxide and sodium sulfide which function to degrade lignin, hemi-celluloses and other non-cellulosic materials to soluble components. The cellulosic fiber which remains is separated from the now "black liquor" resulting from the treatment, which black liquor is subsequently processed for recovery and recycling and/or discard of the constituents.

In the recovery system, the black liquor is concentrated by evaporation and then reacted in a recovery furnace or boiler to yield a smelt, primarily sodium carbonate and sodium sulfide, the smelt then dissolved in water to provide a "green liquor" which, on the addition of lime, becomes white liquor, with the sodium carbonate converted to sodium hydroxide. The calcium carbonate precipitate is removed and calcined to reusable lime. The white liquor is then recycled to pulp additional lignocellulosic material.

The problems associated with the presence of sodium chloride in kraft liquor, introduced into the pulp mill by logs which have absorbed salt water during transport, are well known to coastal pulp mills. Generally, in the past, sodium chloride has been primarily viewed in relationships to corrosion; however, more recently, improvements in and demands upon emission controls have resulted in substantial increases in the level of sodium chloride in the liquor. During pulping operation, sodium chloride is dissolved in the pulping liquor and tends to remain in the chemical recovery cycle. Such sodium chloride represents a dead load since it is inactive in the kraft pulping process, and also reduces the capacity of the recovery furnace or boiler, due to limits generally established on the solids content and the rate of feed of the black liquor into the recovery furnace.

Mills located in the interior or those supplied with logs which have not been salt-water transported do not generally face this problem now; however, in the future reuse of water to limit discharge of pollutants from a kraft mill may result in a significant buildup of sodium chloride in the recovery system, as for example, the recycling of bleach plant effluent. In such systems, chlorine and chlorine dioxide are pulp bleaching agents which are ultimately reduced to the chloride ion during the bleaching process, with the bleach plant effluent normally sewered. However, the effluent can also be used to effect washing of the pulp prior to bleaching and, in this manner, the bleach plant effluent would eventually add to the recovery furnace, adding sodium chloride to the chemical recovery load.

During the regeneration of pulping chemicals in the recovery furnace of conventional chemical recovery systems some solid material is contained in the water vapor and carbon dioxide gaseous emission from the recovery furnace or boiler, with the solid material normally recovered by the use of an electrostatic precipitator ("precipitator catch") and contains sodium sulfate and sodium acid sulfates which can be recycled to the recovery furnace and subsequently reduced to sodium sulfide.

As set forth hereinabove, the problems associated with sodium chloride buildup presently in pulping mills is generally connected with the use of logs towed through salt water, which problem is pronounced in the precipitator catch. A number of reports have been written on sodium chloride buildup in kraft pulping mills with possible solutions offered for its removal. One such proposal would utilize the preferential solubility of sodium chloride as a means for leaching the sodium chloride from the precipitator catch or dust as a salt enriched liquor. However, such a system results in the dissolution and loss of sodium sulfate and sodium carbonate values and a buildup of greater than about 40 percent by weight of solids in the slurry, which concentration is generally too high for conventional handling equipment. Additionally, the sodium carbonate contained in the precipitator catch dissolved during the leaching operation which is lost to the system on discard of the slurry, represents economic losses to the pulp mill.

It has recently been proposed to convert the sodium carbonate to sodium sulfate, to reduce loss of sodium values due to the solubility of the sodium carbonate, by adding to the precipitator catch sufficient sulfuric acid to render the medium acidic and to convert the sodium carbonate to sodium sulfate, filtering the slurry to provide a solid cake phase of anhydrous sodium sulfate and a liquid phase enriched in sodium chloride, and separating the solid and liquid phases. While such process represents an improvement in the handling of black liquor and the removal of dead load sodium chloride, certain disadvantages are inherent in such recovery technique, principally the addition of additional sulfur values to the system and the attendant increase in operating expenses in the use of additional acid and acid handling equipment.

It is an object of the present invention to provide an improved process for the treatment of precipitator catch wherein improved separation of the constituents are effected, additional sulfur values are not added to the system and wherein sodium chloride removal is greatly facilitated.

In accordance with the present invention, precipitator catch containing sodium sulfate, sodium carbonate, sodium chloride and organic materials is removed from the precipitator to a slurry tank or other suitable treatment container by any suitable means, such as a conveyor, where sufficient water is added to produce a readily flowable or pumpable aqueous slurry, carbon dioxide in an amount sufficient to convert the sodium carbonate to the less soluble sodium bicarbonate is fed into the slurry by any suitable means, such as sparging, and the resultant slurry containing sodium sulfate, sodium chloride, sodium bicarbonate and organic material is removed, either on an intermittant or continuous basis to the top of a separatory column, described in detail hereinafter, and discharged by gravity flow into the column. Hot water, at a temperature of from about 30° to about 70° C is added continuously to the separatory column via an inlet located at or near the bottom of the column in countercurrent flow to the downward flow of slurry, with the solids contained in the downward flowing slurry continuously washed by the ascending hot water, any sodium acid sulfate present in the slurry converted to neutral sodium sulfate, the water-soluble components of the slurry, primarily sodium chloride, removed via an outlet located near the top of the separatory column, and sodium sulfate, sodium bicarbonate and other insolubles removed as a slurry via an outlet near the bottom of the column.

Such process permits of simple, efficient and economical removal of dead load sodium chloride while maximizing the recovery of useful sodium sulfate and sodium carbonate values.

The conversion of sodium carbonate to the less soluble sodium bicarbonate can also be effected by removing the precipitator catch to a slurry tank, adding sufficient water thereto to provide a readily flowable or pumpable slurry, directing the slurry to the top of the separatory column and, coinciding with the introduction of the hot water into the separatory column in countercurrent flow to the descending slurry, introducing carbon dioxide into the column via an inlet generally located near the bottom of the column at a position above the water inlet, in amounts sufficient to convert the sodium carbonate to the less soluble sodium bicarbonate.

The sodium chloride-containing solution removed from the top of the separatory column may be sewered, fed to a single vessel or other chlorine dioxide generator, or the like.

The sodium sulfate and sodium bicarbonate obtained by this process can be added to the existing recovery boilers together with additional black liquor feed.

The present process may be operated on a continuous or batch basis, preferably on a continuous basis.

The amount of carbon dioxide added to the precipitator catch slurry, either in the slurry tank or in the separatory column is that amount sufficient to convert essentially all of the sodium carbonate to the less soluble sodium bicarbonate, generally about a slight excess of the stoichiometric amount required for conversion, about 44 pounds of carbon dioxide per each 106 pounds of sodium carbonate.

The carbon dioxide may be added to the precipitator catch slurry, if conversion is effected in the slurry tank, by any convenient means which will provide adequate carbon dioxide sodium carbonate contact, one such suitable means being the sparging of the carbon dioxide into the slurry. Other suitable means for effecting the addition of the carbon dioxide to the slurry will be apparent to those of skill in the art.

The temperature of the slurry is not critical, with a temperature of from about 20° to about 90° C being acceptable for the present process.

The carbon dioxide utilized in the present process may be pure carbon dioxide. Additionally, other sources of carbon dioxide may be employed. For example, the carbon dioxide-enriched off gas from the electrostatic precipitator may be cycled to the slurry or to the separatory column as the source of the carbon dioxide. Additionally, the carbon dioxide may be obtained from the off gas from calcium oxide regenerating kilns in the white liquor production cycle.

In operation, the temperature of the admixture in the column is maintained at from about 30° to 70° C, generally about 30° to about 60° C.

The ratio of water flow and catch slurry to the column is adjusted and the rates of flow controlled as to provide maximum washing efficiency without increasing sodium sulfate and/or sodium bicarbonate loss through the outlet discharging the sodium chloride slurry, generally from about 0.2 to about 4 pounds and preferably about 0.2 to about 2.0 pounds of water per each pound of sodium sulfate discharged from the separatory column.

FIG. 1 is illustrative of the separatory column which is advantageously employed in the process of the present invention.

The apparatus is a separatory column or tower 1 made of any suitable construction materials, such as for example, titanium, plastics, ceramics or the like. The column is preferably, although not necessarily, substantially cylindrical having an inlet means 2 at the upper portion thereof for the introduction of the precipitator catch slurry from a slurry tank (not shown). The lower portion of the column is provided with a hot water inlet, shown generally at 3 and a sulfate-bicarbonate slurry takeoff means 4. The upper portion of the column is provided with a sodium chloride solution takeoff means 5.

In those instances where the conversion of sodium carbonate to sodium bicarbonate is to be effected within the column, the column is provided with suitable inlet means for the carbon dioxide, generally shown at 6 and an excess carbon dioxide takeoff means, located near or at the top of the column (not shown).

The column 1 is divided into multiple washing/reaction zones 9, 11, 13 etc. by plates incorporating multiple downwardly tapering funnel-shaped configurations 7 having openings 8 at the apex for discharging catch slurry downward into a turbulent washing/reactions 9, 11, 13, etc., the flow of solids-containing slurry directed downwardly from plate to plate, and succeeding turbulent washing/reaction zones.

Each plate is provided with multiple apertures 10 located at or near the junction of the uppermost portion of the plate and the column wall. As the catch slurry moves downward onto the plate and through the opening 8, the upcoming flow of hot water is diverted in part through openings 10 setting up a circulatory flow around and in the funnel-shaped configurations, creating turbulence in the zones immediately below the openings 8, continuously washing the catch, washing sodium chloride upward for removal via outlet 5, and passing solids downward for removal via outlet 4.

Zones 12 of the apparatus are relatively non-turbulent zones wherein the solids of the catch slurry settle by gravity are not carried upward by the rising liquid to the washing reaction zone above.

Control of the downward flow of the catch slurry and the extent of turbulence is conveniently effected by adjusting the relative sizes of the openings 8 and 10.

The total number of plates situated in the column may be varied, depending generally upon the size of the precipiator, amounts of catch to be handled in a given time period, space considerations and the like. Generally, in operations where standard pulping/precipitator units are used, columns of about 10–15 feet in length, 2–3 feet in diameter having 8–12 plates situated approximately one foot apart are suitable.

As stated, the sodium sulfate recovered can be recycled to the recovery furnace. Alternately, the recovered sodium sulfate can be fed into a separate recovery boiler and reduced to sodium sulfide, which can then be re-used in the pulping process, removed for use in other applications, or converted to hydrogen sulfide by carbonation with a source of carbon dioxide, e.g., lime kiln gas, with the hydrogen sulfate oxidized to sulfuric acid which can be utilized in chlorine dioxide generation.

In those instances where the catch slurry is removed directly to the column and conversion of sodium carbonate to sodium bicarbonate is to be effected within the column, carbon dioxide from a suitable source (not shown) is admitted to the column via inlet 6, reacts with the sodium carbonate in zones 9, 11, 13, etc., with excess carbon dioxide removed via an outlet generally located near or at the top of the column (not shown).

The column may be located immediately below the slurry tank in which instance the catch slurry moves by gravity flow from the slurry tank (not shown) into the column via inlet 2. In those instances where space and other factors dictate the placement of the column at a site adjacent to or remote from the slurry tank, the catch slurry is pumped by suitable pumping means (not shown) to the column via inlet 2.

In operation, utilizing the process of the present invention, precipitator, catch, slurried with water is reacted with sufficient carbon dioxide in the slurry tank to convert the sodium carbonate present to sodium bicarbonate, the treated catch slurry is removed to the top of the column, moves down the column by gravity flow to admix with the countercurrently upward flowing hot water, sodium chloride being removed as an aqueous slurry via the outlet provided near the top of the column at a position above the catch slurry column inlet, and the sodium sulfate and sodium bicarbonate removed from the bottom of the column.

Where the conversion of sodium carbonate to sodium bicarbonate is effected within the column, precipitator catch, slurried with water, is removed to the top of the separatory column, moves down the column by gravity flow to admix with the countercurrently upward flow of water and carbon dioxide, the sodium carbonate values present reacting with the carbon dioxide to produce sodium bicarbonate, sodium chloride being removed as an aqueous slurry via an outlet located near the top of the separatory column at a position above the catch slurry column inlet, and a slurry of sodium bicarbonate and sodium sulfate present in the catch feed continuously removed from the bottom of the column via an outlet located near the bottom of the column.

Such process permits simple, efficient and economic removal of dead load sodium chloride while maximizing the recovery of useful sodium sulfate and carbonate values.

The composition of a typical precipitator catch obtained in coastal kraft mills contains from about 45 to 75 percent sodium sulfate, 15 to 40 percent sodium chloride, 0.1 to 20 percent sodium carbonate and 1-12 percent organics.

Utilizing the process of the present invention, a precipitator catch of 84 parts sodium sulfate, 24 parts sodium chloride, 6 parts of sodium carbonate and 6 parts of organic material is delivered to a slurry tank, slurried with water to produce a readily flowable slurry, and carbon dioxide is added to the slurry via a sparger to convert the sodium carbonate to sodium bicarbonate. The treated slurry is removed to the separatory column, as previously described. Water at a temperature of about 40° C is fed into the bottom of the column at a rate of about 1.4 pounds of water per each pound of sulfate. Aqueous slurries are removed from both the top and bottom of the column.

Analysis of the takeoffs indicates a complete recovery of the sodium chloride in the upper slurry removal, 7.2 parts of sodium sulfate in the upper slurry with 76.8 parts sodium sulfate and 9.6 parts sodium bicarbonate recovered from the bottom of the column, indicating complete removal of the dead load sodium chloride, a minimal loss of sodium sulfate, and no loss of the sodium carbonate values.

While there have been described preferred embodiments of the present invention, it is apparent that numerous alterations, additions and omissions may be made without departing from the spirit thereof.

What is claimed is:

1. In the process for the pulping of lignocellulosic material comprising the steps of looking the material with pulping liquor, evaporation of the pulping liquor, combustion of the pulping liquor and precipitation as precipitator catch of the solids that are admixed with the combustion gases, said precipitator catch containing sodium sulfate, sodium chloride, sodium carbonate and organic material, the process which comprises adding water to said precipitator catch to produce a flowable slurry thereof in a slurry tank, adding carbon dioxide to said slurry in an amount sufficient to convert said sodium carbonate to sodium bicarbonate, and separating said sodium chloride from said sodium sulfate and said sodium bicarbonate by passing said precipitator catch in a downward flow in a separatory column;

countercurrently passing hot water upwardly through said column at a rate sufficient to effect washing of the downwardly flowing slurry;

removing said sodium sulfate, sodium bicarbonate and organic material in the form of a slurry from the bottom of said separatory column.

2. The process as defined by claim 1 wherein the process is a continuous process.

3. The process as defined by claim 1 wherein the carbon dioxide is added to the precipitator catch slurry in the slurry tank.

4. The process as defined by claim 1 wherein the carbon dioxide is added to the precipitator catch slurry in the separatory column.

5. The process as defined by claim 1 wherein the source of the carbon dioxide is the off gas from the precipitator.

6. The process as defined by claim 1 wherein the temperature of the hot water is maintained at from about 30° to about 70° C.

7. The process as defined by claim 1 wherein the hot water is fed into the separatory column at a rate sufficient to provide from about 0.2 to about 4 pounds of water per each pound of sodium sulfate.

8. The process of claim 7 wherein said rate provides from about 0.2 to about 2.0 pounds of water per pound of sodium sulfate.

9. The process of claim 1 wherein said separatory column contains multiple plates incorporating therein multiple downwardly tapering funnel-shaped configurations for discharging slurry downward and multiple apertures near the junction of the column wall allowing upward flow of water.

* * * * *